United States Patent
Ozaki et al.

(10) Patent No.: US 6,178,803 B1
(45) Date of Patent: Jan. 30, 2001

(54) CRANK PRESS

(75) Inventors: Yutaka Ozaki, Ehime; Masashi Tado, Iyomishima, both of (JP)

(73) Assignee: Sumitomo Heavy Industries, Ltd., Tokyo (JP)

( * ) Notice: Under 35 U.S.C. 154(b), the term of this patent shall be extended for 0 days.

(21) Appl. No.: 09/262,358

(22) Filed: Mar. 4, 1999

(30) Foreign Application Priority Data

Mar. 31, 1998 (JP) .................................................. 10-103683

(51) Int. Cl.[7] .......................................................... B21J 7/46
(52) U.S. Cl. ................................................................ 72/443
(58) Field of Search ............................. 72/436, 441, 443, 72/445, 446, 452.5, 453.03; 100/265, 291, 269.01, 270

(56) References Cited

U.S. PATENT DOCUMENTS

| | | | |
|---|---|---|---|
| 3,427,851 | * | 2/1969 | Michelson .............................. 100/270 |
| 3,776,020 | * | 12/1973 | Fedosenko et al. .................... 72/445 |
| 3,898,834 | * | 8/1975 | Kramer .................................. 72/453 |
| 4,343,175 | * | 8/1982 | Petrov .................................... 72/452 |

FOREIGN PATENT DOCUMENTS

4042187 * 7/1991 (DE) ..................................... 100/270

* cited by examiner

*Primary Examiner*—Rodney A. Butler
(74) *Attorney, Agent, or Firm*—Arent Fox Kintner Plotkin & Kahn, PLLC

(57) ABSTRACT

A crank press, wherein the power of an electric motor is transmitted to a crankshaft and a connecting rod connected thereto through a clutch to lower a slider and a brake coupled to the crankshaft slows down and stops the ascending slider at its top dead point at the end of each cycle, comprising (i) an oil-hydraulic pump/motor which engages the crankshaft through gears, (ii) an accumulator which is connected to the oil-hydraulic pump/motor by oil paths a, b and c, and (iii) first and second switching valves which switch the oil flow between an energy-absorbing mode to feed hydraulic oil to the accumulator through the oil-hydraulic pump/motor and an energy-releasing mode to feed hydraulic oil from the accumulator to the oil-hydraulic pump/motor.

8 Claims, 8 Drawing Sheets

F I G. 1
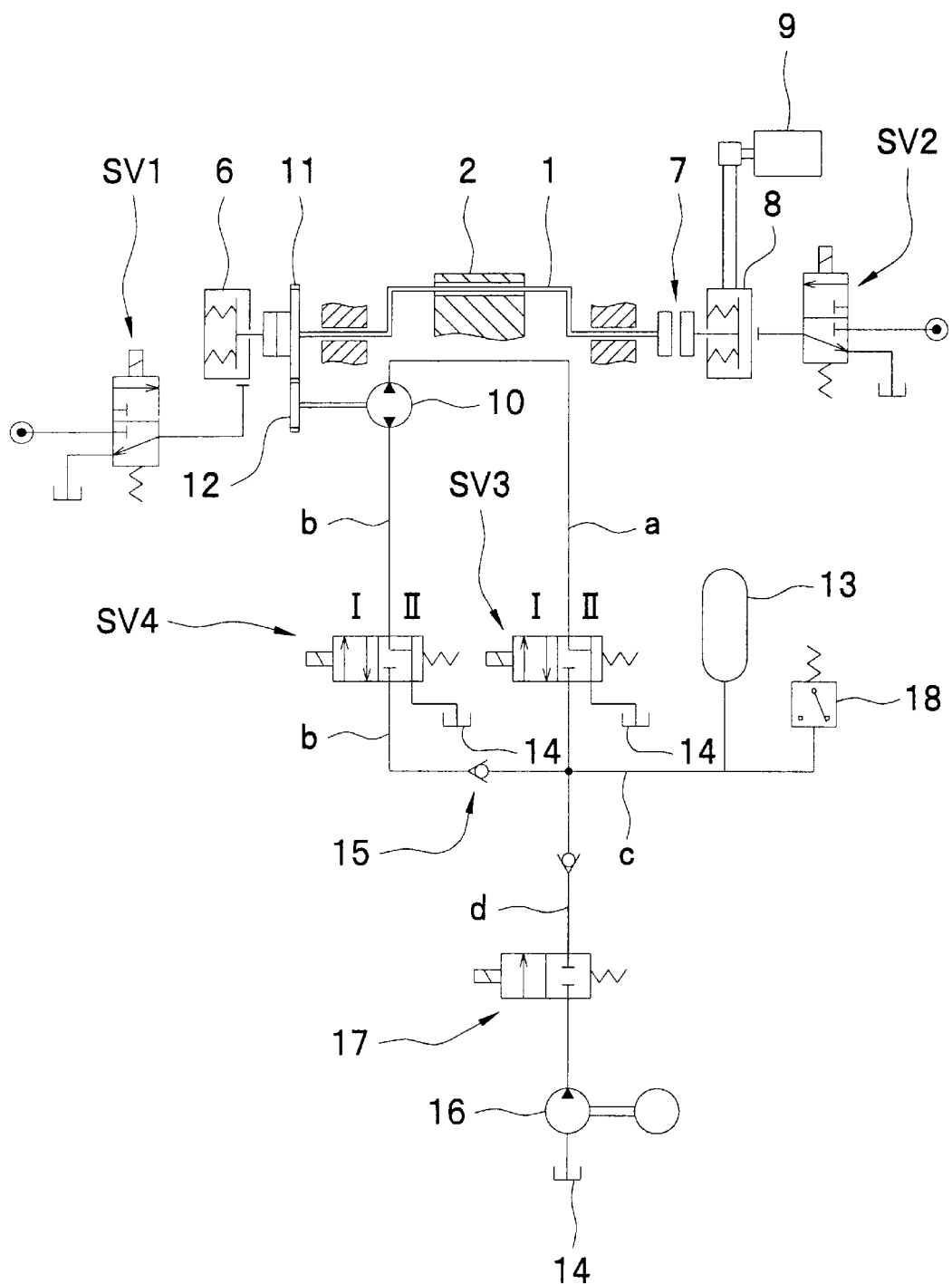

F I G. 4
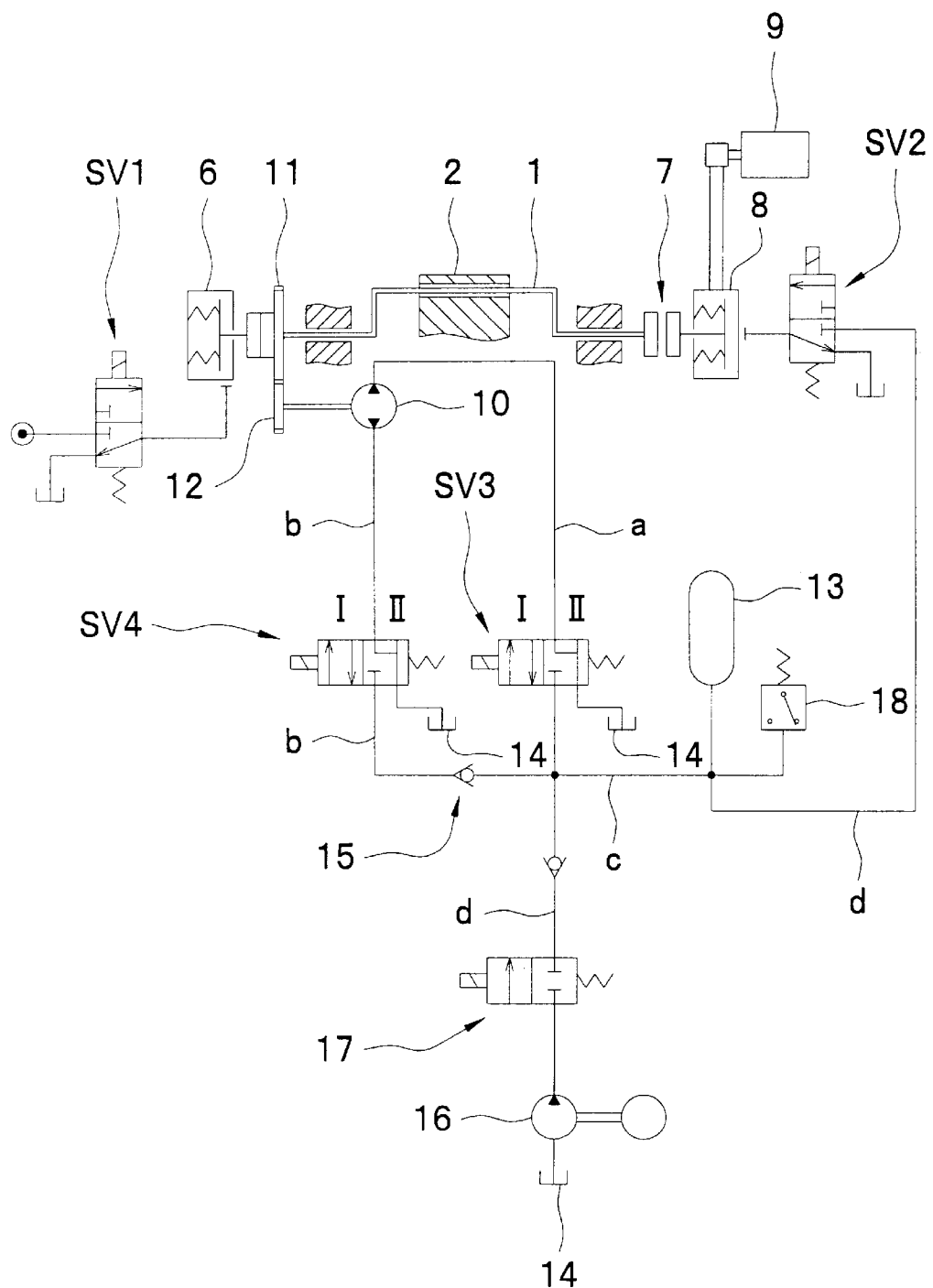

F I G. 5
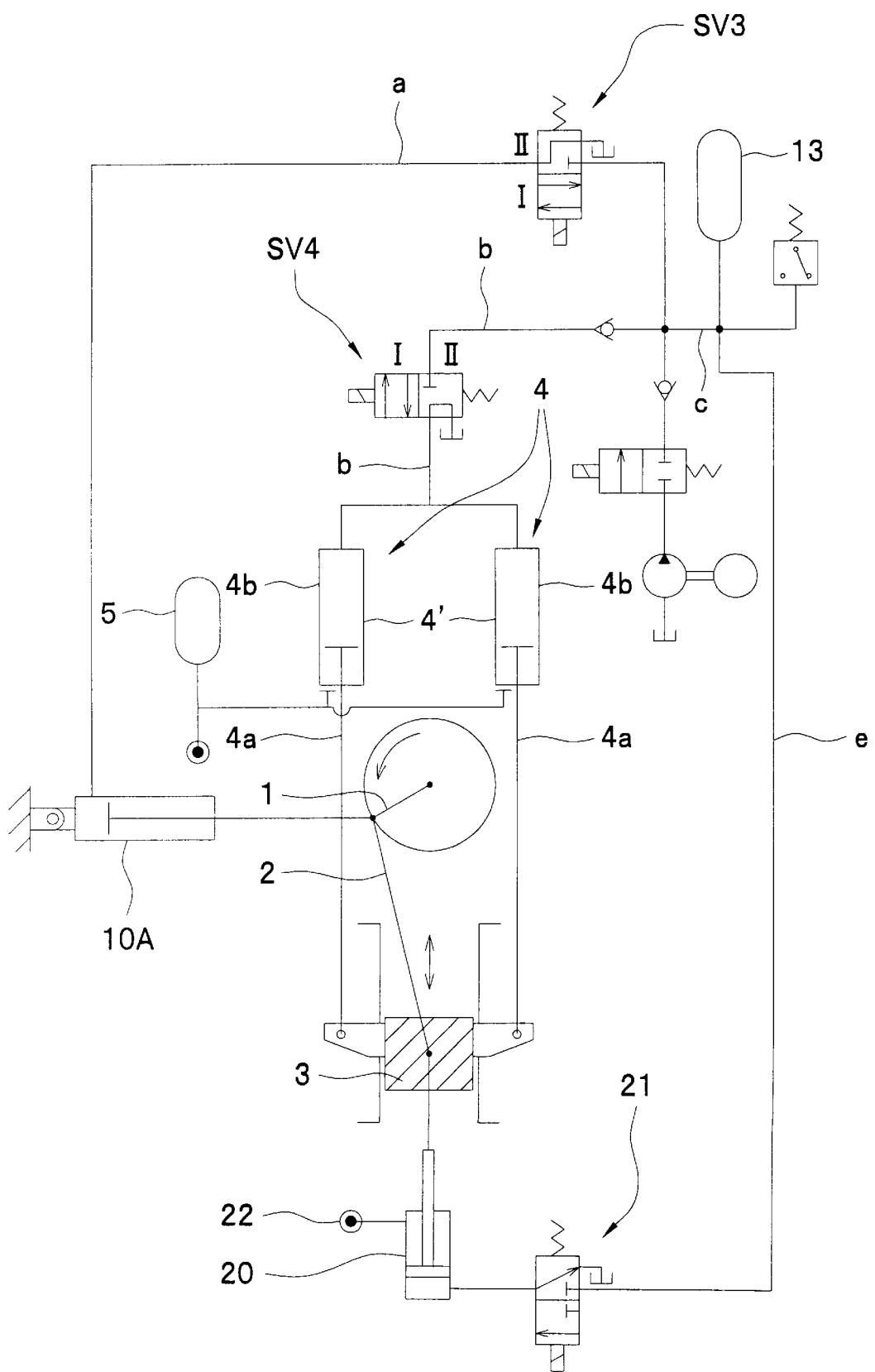

CRANK PRESS

BACKGROUND OF THE INVENTION

The present invention relates generally to a crank press, and more particularly to a crank press for forging and sheet metal processing.

FIG. 6 is an illustration of the basic structure of the so-called crank press. A crankshaft 1 is driven by an electric motor or the like and connected to a slider 3 by a connecting rod 2. An upper metal mold is fixed to the bottom of the slider 3, and a lower metal mold is fixed onto a bed (not shown). A work is put between the upper and lower metal molds and the slider 3 is lowered to forge or form the work into a certain shape.

Connected to the slider 3 are the piston rods 4a of a pair of balance cylinders 4, and the cylinders 4b of the balance cylinders 4 are fed with compressed air from an accumulator 5, to always exert upward force to the crankshaft 1 through the media of the slider 3 and connecting rod 2. Under the condition, the crankshaft 1 is driven to move the slider 3 up and down through the medium of the connecting rod 2.

In case of the general-purpose hot-forging crank press, the crankshaft 1 is stopped at its top dead center at the end of each cycle. To accomplish this, the conventional crank press is given a mechanism shown in FIG. 7.

Coupled to an end of the crankshaft 1 is a brake 6, which is controlled pneumatically by a brake control valve SV1 and switched between the working and nonworking states. Besides, coupled to the other end of the crankshaft 1 are a clutch 7 and a flywheel 8. The flywheel 8 is rotated by an electric motor 9 through the medium of a belt. The clutch 7 is controlled pneumatically by a clutch control valve SV2 and switched between the states of engagement and disengagement.

Referring to FIG. 6, 7 and 8, the operation of the above conventional crank press will now be described.

Now the slider 3 is at a stop at its top dead point. When a signal to initiate a pressing cycle is given, the brake control valve SV1 releases the brake 6, and then the clutch control valve SV2 engages the clutch 7. The electric motor 9 drives the crankshaft 1, and the slider 3 begins to move down. When the slider 3 reaches its bottom dead point, the clutch control valve SV2 disengages the clutch 7, and the slider 3 moves upward by the inertia force of the turning parts. While the slider 3 is moving upward, the brake control valve SV1 activates the brake 6 to stop and keep the slider 3 at its top dead point until the next pressing cycle is initiated.

By repeating the above process, the crank press operates continually, stopping the slider 3 at its top dead point at the end of every cycle.

In case of the above conventional crank press, a large capacity is required of the brake 6 in order to absorb instantaneously the large energy of the slider 3, etc. and the pulling-up force of the balance cylinders 4 and stop the slider 3 at its top dead point. Besides, a large capacity is required of the electric motor 9 in order to cause the crankshaft 1, etc. to begin to turn or move. Thus, in the conventional crank press, large energy has to be exerted and absorbed, or consumed, at the beginning and end of each pressing cycle, respectively.

In accordance with the above, the object of the present invention is to provide a crank press wherein energy is utilized effectively and, thereby, the load on the brake, the required capacity of the electric motor, and the overall noise level are reduced.

SUMMARY OF THE INVENTION

According to the first aspect of the present invention, there is provided a crank press, wherein the power of an electric motor is transmitted to a crankshaft and a connecting rod connected thereto through a clutch to lower a slider and a brake coupled to the crankshaft slows down and stops the ascending slider at its top dead point at the end of each cycle, comprising an energy absorbing/releasing means which (i) transforms part of the kinetic energy during the ascent of the slider into hydraulic energy and absorbs the transformed energy and (ii) releases and transforms the hydraulic energy into kinetic energy of the slider during the descent of the slider.

According to the second aspect of the present invention, there is provided a crank press according to the first aspect wherein the energy absorbing/releasing means comprises (i) an oil-hydraulic pump/motor which is coupled to the crankshaft through gears and receives and gives torque from and to the crankshaft, (ii) an accumulator which is connected to the oil-hydraulic pump/motor by an oil-hydraulic circuit, and (iii) a switching means which switches the energy absorbing/releasing means between an energy-absorbing mode to feed hydraulic oil to the accumulator through the oil-hydraulic pump/motor and an energy-releasing mode to feed hydraulic oil from the accumulator to the oil-hydraulic pump/motor.

According to the third aspect of the present invention, there is provided a crank press according to the second aspect wherein the switching means comprises a first switching valve and a second switching valve, both put in the oil-hydraulic circuit, each switchable between a first position to allow the accumulator and the oil-hydraulic pump/motor to communicate with each other and a second position to allow an oil tank and the oil-hydraulic pump/motor to communicate with each other.

According to the fourth aspect of the present invention, there is provided a crank press according to the first aspect wherein the energy absorbing/releasing means comprises (i) an oil-hydraulic pump/cylinder which receives and gives driving force from and to the crankshaft or the connecting rod, the piston rod of the oil-hydraulic pump/cylinder coupled to the crank pin of the crankshaft, or a portion, near the crank pin, of the crankshaft, or a portion, near the crank pin, of the connecting rod, (ii) an accumulator which is connected to the chambers of the oil-hydraulic pump/cylinder and a pair of balance cylinders by oil-hydraulic circuits, each chamber on the opposite side of the piston rod, and (iii) a switching means which switches the energy absorbing/releasing means between an energy-absorbing mode to feed hydraulic oil from the oil-hydraulic pump/cylinder to the accumulator and an energy-releasing mode to feed hydraulic oil from the accumulator to the oil-hydraulic pump/cylinder.

According to the fifth aspect of the present invention, there is provided a crank press, wherein the power of an electric motor is transmitted to a crankshaft and a connecting rod connected thereto through a clutch to lower a slider and a brake coupled to the crankshaft slows down and stops the ascending slider at its top dead point at the end of each cycle, comprising (i) an energy absorbing/releasing means which transforms part of the kinetic energy during the ascent of the slider into hydraulic energy and absorbs the transformed energy and releases and transforms the hydraulic energy into kinetic energy of the slider during the descent of the slider, and (ii) an oil-hydraulic circuit for the clutch, the oil-hydraulic circuit connected to the oil-hydraulic circuit constituting the energy absorbing/releasing means.

According to the sixth aspect of the present invention, there is provided a crank press, wherein the power of an electric motor is transmitted to a crankshaft and a connecting rod connected thereto through a clutch to lower a slider and a brake coupled to the crankshaft slows down and stops the ascending slider at its top dead point at the end of each cycle, comprising (i) an energy absorbing/releasing means which transforms part of the kinetic energy during the ascent of the slider into hydraulic energy and absorbs the transformed energy and releases and transforms the hydraulic energy into kinetic energy of the slider during the descent of the slider, and (ii) an oil-hydraulic circuit for a bottom knockout cylinder, the oil-hydraulic circuit connected to the oil-hydraulic circuit constituting the energy absorbing/releasing means.

The advantages offered by the first aspect of the present invention are mainly as follows. The required capacity of the brake to stop the slider can be reduced because the kinetic energy is reduced by transforming part of the kinetic energy into hydraulic energy during the ascent of the slider. Besides, the required capacity of the electric motor can be reduced because the hydraulic energy stored during the ascent of the slider can be used for the descent of the slider at the beginning of each cycle. By utilizing the energy effectively in this way, the noise level of the crank press is also reduced.

The advantages offered by the second aspect of the present invention are mainly as follows. Because the crankshaft and the oil-hydraulic pump/motor are engaged with each other through the gears so that torque can be transmitted in either direction between them, the oil-hydraulic pump/motor functions as a pump to store pressurized oil into the accumulator during the ascent of the slider, and the pressurized oil in the accumulator causes the oil-hydraulic pump/motor to function as a motor and turn the crankshaft and thereby give downward kinetic energy to the slider at the beginning of each cycle and during subsequent descent of the slider. In this way, intertransformation between the kinetic energy and the hydraulic energy is done, which reduces the required capacities of the crankshaft-driving electric motor and the brake.

The advantages offered by the third aspect of the present invention are mainly as follows. Because the first and second switching valves switch the oil flow timely between an oil path to cause the oil-hydraulic pump/motor to function as a pump and an oil path to cause the same to function as a motor, energy can be absorbed and released with a simple oil-hydraulic circuit. Besides, by optimizing the timing of the clutch and brake, the vibration and noises of the crank press can be reduced, which makes the operation of the crank press smooth.

The advantages offered by the fourth aspect of the present invention are mainly as follows. The oil-hydraulic pump/cylinder functions as a pump to store pressurized oil into the accumulator during the ascent of the slider, and the pressurized oil in the accumulator causes the oil-hydraulic pump/cylinder to function as a cylinder and give downward kinetic energy to the slider during the descent of the slider. In this way, intertransformation between the kinetic energy and the hydraulic energy is done, which reduces the required capacities of the crankshaft-driving electric motor and the brake. Besides, because an oil-hydraulic pump/cylinder, instead of an oil-hydraulic pump/motor, is used in the energy absorbing/releasing means, higher operating efficiency is achieved.

The advantage offered by the fifth aspect of the present invention is as follows. Because the pressurized oil for engaging and disengaging the clutch is fed from the oil-hydraulic circuit of the energy absorbing/releasing means, no compressor for engaging and disengaging the clutch is required, which makes the crank press compact and eliminates exhaust noises.

The advantage offered by the sixth aspect of the present invention is as follows. Because the pressurized oil for the bottom knockout cylinder is fed from the oil-hydraulic circuit of the energy absorbing/releasing means, it is unnecessary to provide the bottom knockout cylinder with a specific source of pressurized oil, which makes the crank press compact.

BRIEF DESCRIPTION OF THE DRAWINGS

The features and advantages of the present invention will become more clearly appreciated from the following description in conjunction with the accompanying drawings, in which:

FIG. 1 is an oil-hydraulic circuit diagram of an embodiment of crank press of the present invention;

FIG. 4 is an oil-hydraulic circuit diagram of the third embodiment of crank press of the present invention;

FIG. 5 is an oil-hydraulic circuit diagram of the fourth embodiment of crank press of the present invention;

DETAILED DESCRIPTION OF THE PREFERRED EMBODIMENTS

With reference to the drawings, a preferred embodiment of the present invention will now be described.

In FIG. 1, the numeral 1 indicates a crankshaft; 2, a connecting rod; 6, a brake; 7, a clutch; 8, a flywheel; 9, an electric motor; SV1, a brake control valve; SV2, a clutch control valve. They are essentially the same as those of the conventional crank press shown in FIG. 7.

Figure 7:
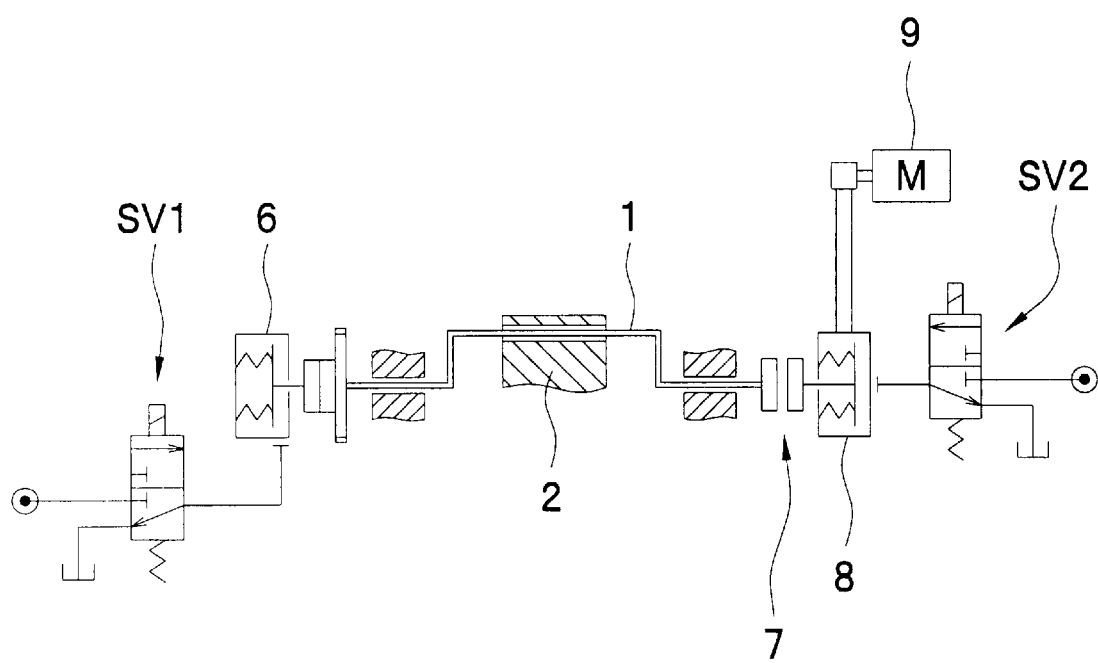
FIG. 7 is an illustration of the structure of a portion including the clutch and brake of the conventional crank press.
Figure 8:
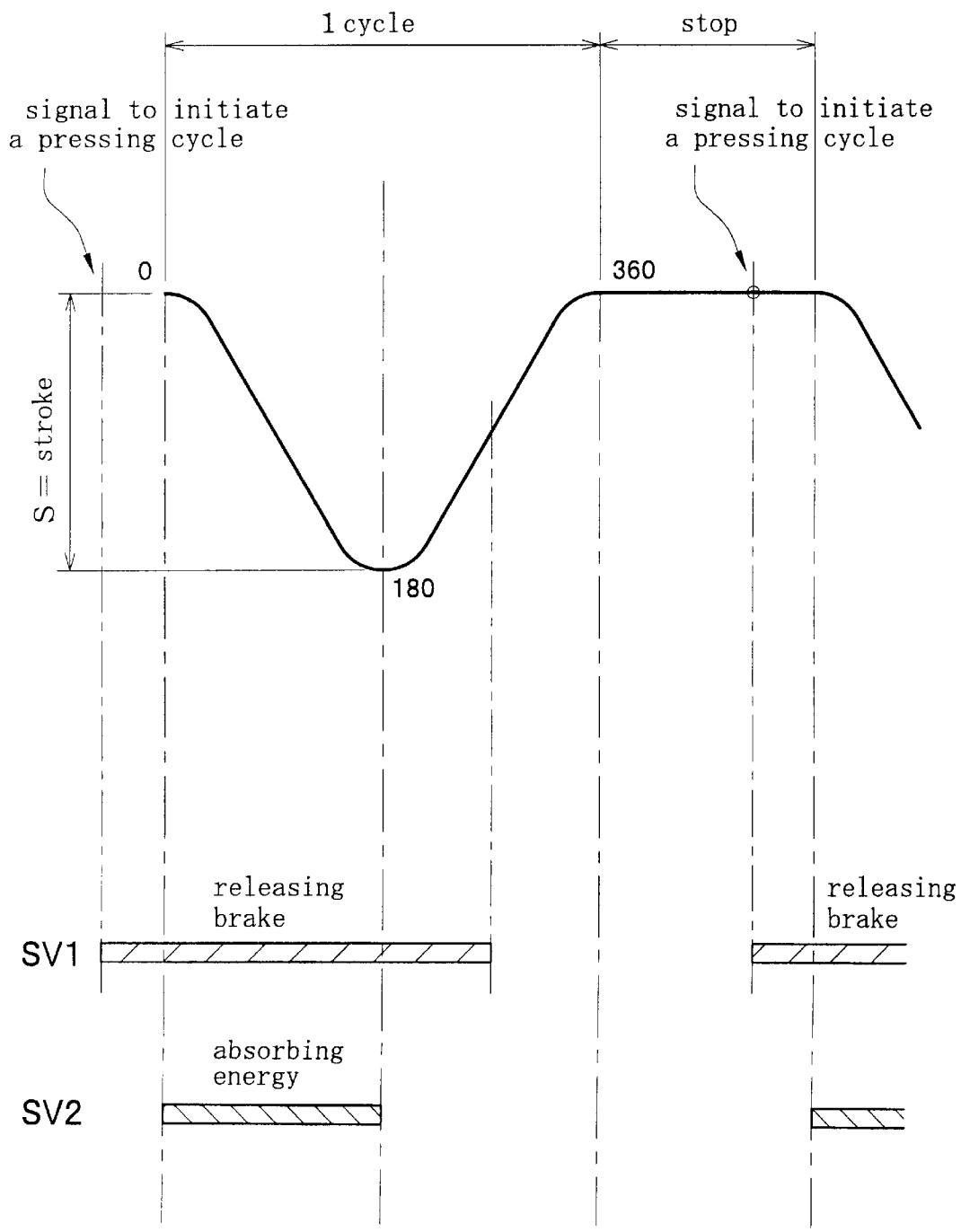
FIG. 8 is an operating time chart of the conventional crank press.

A slider 3 and a pair of balance cylinders 4 (not shown) are also provided as in the case of the conventional crank press shown in FIG. 7.

The crank press of the present embodiment features that the following oil-hydraulic circuit is added to the above mechanism. The oil-hydraulic circuit will now be described. This added portion constitutes the energy absorbing/releasing means mentioned in the above SUMMARY OF THE INVENTION.

A gear 11 fixed on the crankshaft 1 engages a gear 12 fixed on the drive shaft of an oil-hydraulic pump/motor 10. The oil-hydraulic pump/motor 10 functions as both an oil-hydraulic pump and an oil-hydraulic motor. When driven by the crankshaft 1's side, the oil-hydraulic pump/motor 10 functions as an oil-hydraulic pump. When driven by the pressurized oil, it functions as an oil-hydraulic motor, turning and driving the crankshaft 1's side. The oil-hydraulic pump/motor 10 can be any of gear, vane, piston, and other types.

Connected to the inlet and outlet ports of the oil-hydraulic pump/motor 10 are oil paths a and b, and an accumulator 13 is connected to the oil paths a and b through an oil path c. A first switching valve SV3 is provided in the oil path a; a second switching valve SV4, in the oil path b.

Each of the switching valves SV3 and SV4 is a solenoid-driven switching valve with four ports and two functioning positions. The switching valves SV3 and SV4, in their positions I under the force of their solenoids, allow the oil-hydraulic pump/motor 10 and accumulator 13 to communicate with each other and, in their positions II under the force of their springs, isolate the oil path c from the oil paths a and b, checking the pressurized oil within the accumulator 13. These positions I and II of the switching valves SV3 and SV4 are the first and second positions of the same mentioned in the above SUMMARY OF THE INVENTION. The switching valves SV3 and SV4 rest in their positions II under the force of their springs while their solenoids are in a magnetic neutral state.

A check valve 15 is so provided in the oil path b that it allows pressurized oil to flow to the accumulator 13 but checks the outflow of pressurized oil from the accumulator 13.

The first and second switching valves SV3 and SV4 constitute the switching means mentioned in the above SUMMARY OF THE INVENTION.

Another oil path d, an oil-hydraulic pump 16, and a valve 17 are provided to feed hydraulic oil at the beginning of the operation of the crank press and supplement hydraulic oil if hydraulic oil leaks. A pressure switch 18 is provided to monitor the oil pressure in the accumulator 13. When the oil pressure in the accumulator 13 decreases to a given level, the pressure switch 18 functions, and the oil pump 16 starts and the valve 17 opens to feed hydraulic oil to the oil path c and accumulator 13.

Figure 2:
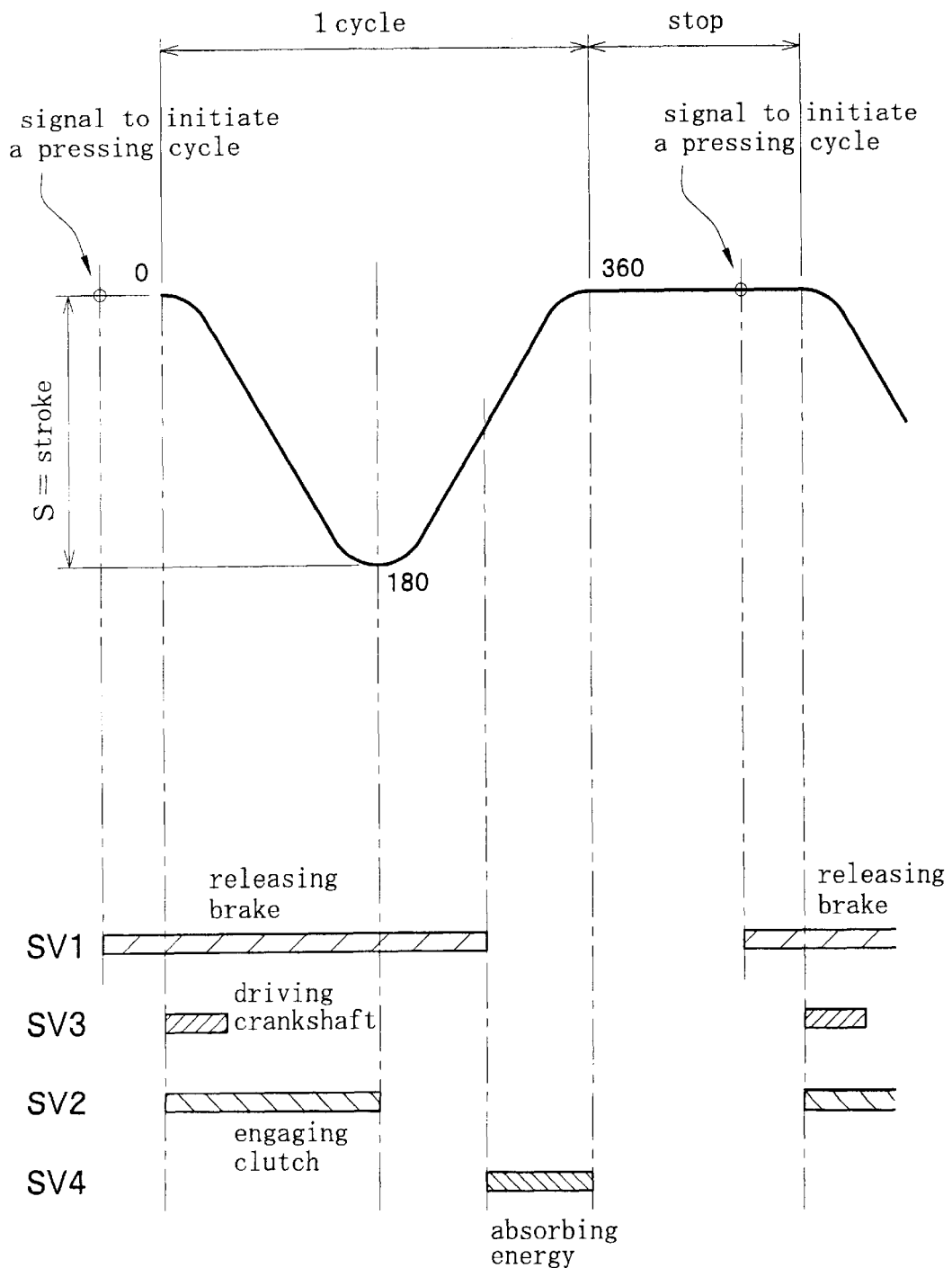
FIG. 2 is a time chart of the control valves of the crank press of FIG. 1.

With reference to FIGS. 1 and 2, the operation of the crank press will now be described.

(1) While the slider 3 is at its top dead point, the brake control valve SV1 releases the brake 6. Then, the first switching valve SV3 shifts to its position I, allowing the pressurized oil in the accumulator 13 to flow through the oil paths c, a and b, which causes the oil-hydraulic pump/motor 10 to turn. In the meantime, the check valve 15 prevents the oil in the path c from flowing into the path b. The torque of the oil-hydraulic pump/motor 10 is transmitted to the crankshaft 1 through the gears 12 and 11 to start a pressing cycle of the crank press. In this way, each pressing cycle of the crank press is initiated by the hydraulic energy from the accumulator 13.

At the same time as the first switching valve SV3, the clutch control valve SV2 functions and causes the clutch 7 to engage. The energy accumulated in the flywheel 8 and the energy of the electric motor 9 cause the crankshaft 1 to turn. In this way, the crankshaft 1 is driven by both the energy released from the accumulator 13 and the energy of the electric motor 9. When the turning speed of the crankshaft 1 reaches a certain steady state, the first switching valve SV3 is demagnetized to isolate the oil path c of the accumulator 13. Under the condition, the inlet and outlet ports of the oil-hydraulic pump/motor 10 are communicating with a tank 14, and the oil-hydraulic pump/motor 10 is turning, just following the turn of the crankshaft 1's side. In this way, the slider 3 is driven to its bottom dead point where the upper metal mold meets the lower metal mold. When the slider 3 reaches its bottom dead point, the clutch control valve SV2 disengages the clutch 7.

(2) Then, the slider 3 begins to ascend. Halfway in the ascent of the slider 3, the second switching valve SV4 shifts to its position I. Under the condition, the slider 3 is raised by the inertia force of the turning parts, and the oil-hydraulic pump/motor 10 is turned by the crankshaft 1 through the gears 11 and 12. Thus, hydraulic oil in the tank 14 is sucked up and fed to the accumulator 13 through the oil paths a, b and c, the check valve 15 letting the hydraulic oil through. In this way, hydraulic oil is fed to the accumulator 13 by the kinetic energy of the turning parts. Namely, the kinetic energy is transformed into hydraulic energy, and the transformed energy is accumulated in the accumulator 13.

Just before the slider 3 reaches its top dead point, the second switching valve SV4 is demagnetized and, at the same time, the brake control valve SV1 is also demagnetized to engage the brake 6 and stop the slider 3 at its top dead point. The slider 3 is held at its top dead point by the brake 6 until the next pressing cycle is initiated.

The above downward and upward strokes (1) and (2) are repeated in every pressing cycle.

The crank press of the present embodiment has the following advantages.

① Because the kinetic energy of the turning parts is transformed into hydraulic energy and accumulated in the accumulator 13 before the end of each pressing cycle, the slider 3 is slowed down and, hence, the capacity required of the brake 6 is reduced.

② Because the hydraulic energy transformed from the kinetic energy and stored during the ascent of the slider 3 can be used at the beginning of each pressing cycle, the capacity required of the electric motor 9 is reduced.

③ Because the clutch 7 engages in a static friction state rather than in a kinetic friction state, the wear of the clutch lining is reduced.

④ The clutch 7 and the brake 6 engage and disengage smoothly, generating less vibration and noises.

Figure 3:
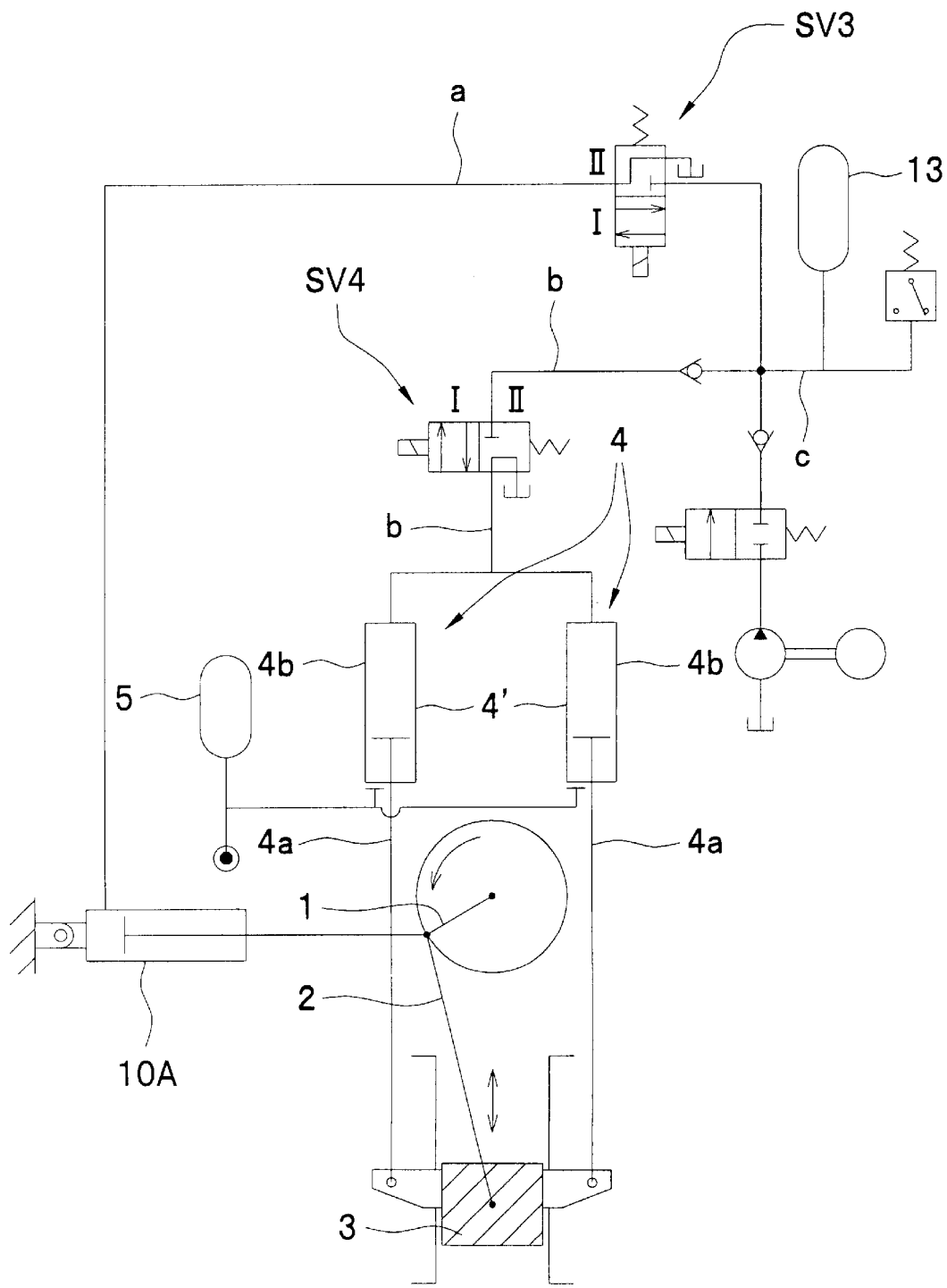
FIG. 3 is an oil-hydraulic circuit diagram of the second embodiment of crank press of the present invention.
Figure 6:
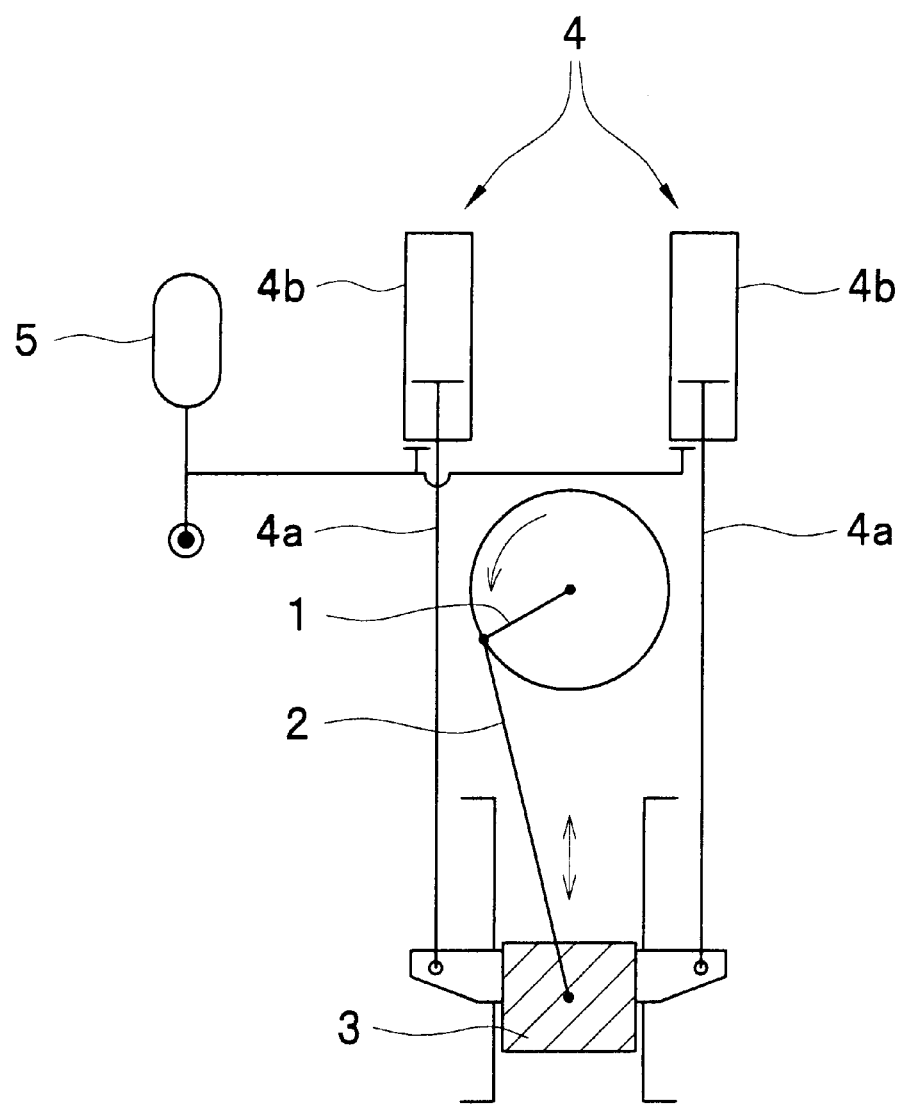
FIG. 6 is an illustration of the basic structure of the so-called crank press.

Referring to FIG. 3, the second embodiment of the present invention will now be described. The sign 10A indicates an oil-hydraulic pump/cylinder, of which the piston rod is coupled to the crankshaft 1.

The piston rod of the oil-hydraulic pump/cylinder 10A may be coupled to the connecting rod 2 instead of the crankshaft 1. One end of the oil path b branches off and is connected to the chambers 4' of paired balance cylinders 4, each chamber 4' on the opposite side of the piston rod 4a. The crank press of this embodiment has the same construction as that of the first embodiment, except that one end of the oil path a and one end of the oil path b are connected to oil-hydraulic cylinder 10A and the balance cylinders 4, respectively.

The crank press of this embodiment has higher operational efficiency than that of the first embodiment because an energy absorbing/releasing means comprising an oil-hydraulic cylinder, instead of an oil-hydraulic pump/motor, is adopted.

Referring to FIG. 4, the third embodiment of the present invention will now be described. The crank press of this embodiment has the same construction as that of the first embodiment, except that an oil path d which branches off from the oil path c connected to the accumulator 13 is provided to feed pressurized oil to the clutch control valve SV2.

In this embodiment, because a large compressor is not required, the crank press becomes compact, the power consumption is reduced, and no exhaust noises are emitted.

Referring to FIG. 5, the fourth embodiment of the present invention will now be described. The crank press of this embodiment has the same construction as that of the second embodiment, except that an oil path e which branches off from the oil path c connected to the accumulator 13 is provided to operate a bottom knockout cylinder 20. The numeral 21 indicates a solenoid valve for the control of the bottom knockout cylinder 20, and the numeral 22 indicates an air source to lower the piston of the bottom knockout cylinder 20. In this embodiment, because the pressurized oil is fed from the accumulator 13 to the bottom knockout cylinder 20, the bottom knockout cylinder 20 does not require an exclusive pressurized oil source.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What we claim is:

1. A crank press, wherein the power of an electric motor is transmitted to a crankshaft and a connecting rod connected thereto through a clutch to lower a slider and a brake coupled to the crankshaft slows down and stops the ascending slider at its top dead point at the end of each cycle, comprising:

an energy absorbing/releasing means which (i) transforms part of the kinetic energy during the ascent of the slider into hydraulic energy and absorbs the transformed energy and (ii) releases and transforms the hydraulic energy into kinetic energy of the slider during the descent of the slider, wherein the energy absorbing/releasing means comprises:

an oil-hydraulic pump/motor which engages the crankshaft through gears and receives and gives torque from and to the crankshaft;

an accumulator which is connected to the oil-hydraulic pump/motor by an oil-hydraulic circuit; and a switching means which switches the energy absorbing/releasing means between an energy-absorbing mode to feed hydraulic oil to the accumulator through the oil-hydraulic pump/motor and an energy-releasing mode to feed hydraulic oil from the accumulator to the oil-hydraulic pump/motor.

2. A crank press as claimed in claim 1 wherein the switching means comprises a first switching valve and a second switching valve, both put in the oil-hydraulic circuit, each switchable between a first position to allow the accumulator and the oil-hydraulic pump/motor to communicate with each other and a second position to allow an oil tank and the oil-hydraulic pump/motor to communicate with each other.

3. A crank press as claimed in claim 1 wherein the energy absorbing/releasing means comprises:

an oil-hydraulic pump/cylinder which receives and gives driving force from and to the crankshaft or the connecting rod, the piston rod of the oil-hydraulic pump/cylinder coupled to the crank pin of the crankshaft, or a portion, near the crank pin, of the crankshaft, or a portion, near the crank pin, of the connecting rod;

an accumulator which is connected to chambers of the oil-hydraulic pump/cylinder and a pair of balance cylinders by oil-hydraulic circuits, each chamber on the opposite side of the piston rod; and a switching means which switches the energy absorbing/releasing means between an energy-absorbing mode to feed hydraulic oil from the oil-hydraulic pump/cylinder to the accumulator and an energy-releasing mode to feed hydraulic oil from the accumulator to the oil-hydraulic pump/cylinder.

4. A crank press, wherein the power of an electric motor is transmitted to a crankshaft and a connecting rod connected thereto through a clutch to lower a slider and a brake coupled to the crankshaft slows down and stops the ascending slider at its top dead point at the end of each cycle, comprising:

an energy absorbing/releasing means which (i) transforms part of the kinetic energy during the ascent of the slider into hydraulic energy and absorbs the transformed energy and (ii) releases and transforms the hydraulic energy into kinetic energy of the slider during the descent of the slider; and an oil-hydraulic circuit for the clutch, the oil-hydraulic circuit connected to the oil-hydraulic circuit for said clutch is constituting the energy absorbing/releasing means.

5. A crank press, wherein the power of an electric motor is transmitted to a crankshaft and a connecting rod connected thereto through a clutch to lower a slider and a brake coupled to the crankshaft slows down and stops the ascending slider at its top dead point at the end of each cycle, comprising:

an energy absorbing/releasing means which (i) transforms part of the kinetic energy during the ascent of the slider into hydraulic energy and absorbs the transformed energy and (ii) releases and transforms the hydraulic energy into kinetic energy of the slider during the descent of the slider; and an oil-hydraulic circuit for a bottom knockout cylinder, the oil-hydraulic circuit for the bottom knockout cylinder is connected to the oil-hydraulic circuit constituting the energy absorbing/releasing means.

6. A crank press, wherein the power of an electric motor is transmitted to a crankshaft and a connecting rod connected thereto through a clutch to lower a slider and a brake coupled to the crankshaft slows down and stops the ascending slider at its top dead point at the end of each cycle, comprising:

an energy absorbing/releasing means which (i) transforms part of the kinetic energy during the ascent of the slider into hydraulic energy and absorbs the transformed energy and (ii) releases and transforms the hydraulic energy into kinetic energy of the slider during the descent of the slider, wherein the energy absorbing/releasing means comprises:

an oil-hydraulic pump/cylinder which receives and gives driving force from and to the crankshaft or connecting rod, the piston rod of the oil-hydraulic pump/cylinder coupled to the crank pin of the crankshaft, or a portion, near the crank pin, of the crankshaft, or a portion, near the crank pin, of the connecting rod;

an accumulator which is connected to chambers of the oil-hydraulic pump/cylinder and a pair of balance cylinders by oil-hydraulic circuits, each chamber or opposite side of the piston rod; and a switching means which switches the energy absorbing/
releasing means between an energy-absorbing mode to
feed hydraulic oil from the oil-hydraulic pump/cylinder
to the accumulator and an energy-releasing mode to
feed hydraulic oil from the accumulator to the oil-
hydraulic pump/cylinder.

7. The crank press according to either one of claim 1 or
6, further comprising an oil-hydraulic circuit for the clutch,
the oil-hydraulic circuit for the clutch is connected to the
oil-hydraulic circuit constituting the energy absorbing/
releasing means.

8. The crank press according to either one of claim 1 or
6, further comprising an oil-hydraulic circuit for a bottom
knockout cylinder, the oil-hydraulic circuit for the bottom
knockout cylinder is connected to the oil-hydraulic circuit
constituting the energy absorbing/releasing means.

\* \* \* \* \*